No. 731,670. Patented June 23, 1903.

UNITED STATES PATENT OFFICE.

WALTER DOLLFUS AND RUDOLF HAGENBACH, OF HÖCHST-ON-THE-MAIN, GERMANY, ASSIGNORS TO FARBWERKE, VORM. MEISTER, LUCIUS & BRÜNING, OF HÖCHST-ON-THE-MAIN, GERMANY, A CORPORATION OF GERMANY.

YELLOW MONOAZO DYESTUFF AND PROCESS OF MAKING SAME.

SPECIFICATION forming part of Letters Patent No. 731,670, dated June 23, 1903.

Application filed April 11, 1903. Serial No. 152,119. (No specimens.)

*To all whom it may concern:*

Be it known that we, WALTER DOLLFUS, Ph. D., and RUDOLF HAGENBACH, Ph. D., citizens of the Swiss Republic, residing at Höchst-on-the-Main, Germany, have invented certain new and useful Improvements in the Manufacture of a Yellow Monoazo Dyestuff from Ortho-Amido-Para-Sulfobenzoic Acid and Phenylmethylpyrazolon, of which the following is a specification.

By combining diazotized ortho-amido-para-sulfobenzoic acid with phenylmethylpyrazolon a yellow azo dyestuff is obtained which is particularly suited for the manufacture of insoluble yellow color-lakes fast to water, acid, lime, and light, especially as regards the latter, if compared with the anilin dyestuffs hitherto used for this purpose.

The manufacture of the new dyestuff is illustrated as follows:

Example: The diazo compound obtained from 21.7 kilos of ortho-amido-para-sulfobenzoic acid in the usual manner with hydrochloric acid, and nitrite is gradually run into a solution of 17.5 kilos of phenylmethylpyrazolon in the equivalent quantity of caustic-soda lye and in presence of fifteen kilos of sodium carbonate.

The dyestuff separates at once as a viscous yellow mass, which on the reaction being complete is precipitated by boiling with common salt and then dried.

When dry, the dyestuff is a yellow powder, soluble with difficulty in cold and readily soluble in hot water.

Having now described our invention, what we claim is—

1. The herein-described process for the manufacture of a yellow monoazo dyestuff specially suited for preparing color-lakes fast to light and for dyeing paper which consists in combining diazotized ortho-amido-para-sulfobenzoic acid with phenylmethylpyrazolon, substantially as set forth.

2. As a new product the monoazo dyestuff obtained by combining diazotized ortho-amido-para-sulfobenzoic acid with phenylmethylpyrazolon, being when dry a yellow powder, soluble with difficulty in cold and readily soluble in hot water and specially suited for preparing yellow insoluble color-lakes fast to water, acid, lime, and light.

In testimony that we claim the foregoing as our invention we have signed our names in presence of two subscribing witnesses.

WALTER DOLLFUS.
RUDOLF HAGENBACH.

Witnesses:
ALFRED BRISBOIS,
BERNHARD LEYDECKER.